(No Model.)
P. WEBER.
ANNUNCIATOR.
No. 524,098. Patented Aug. 7, 1894.
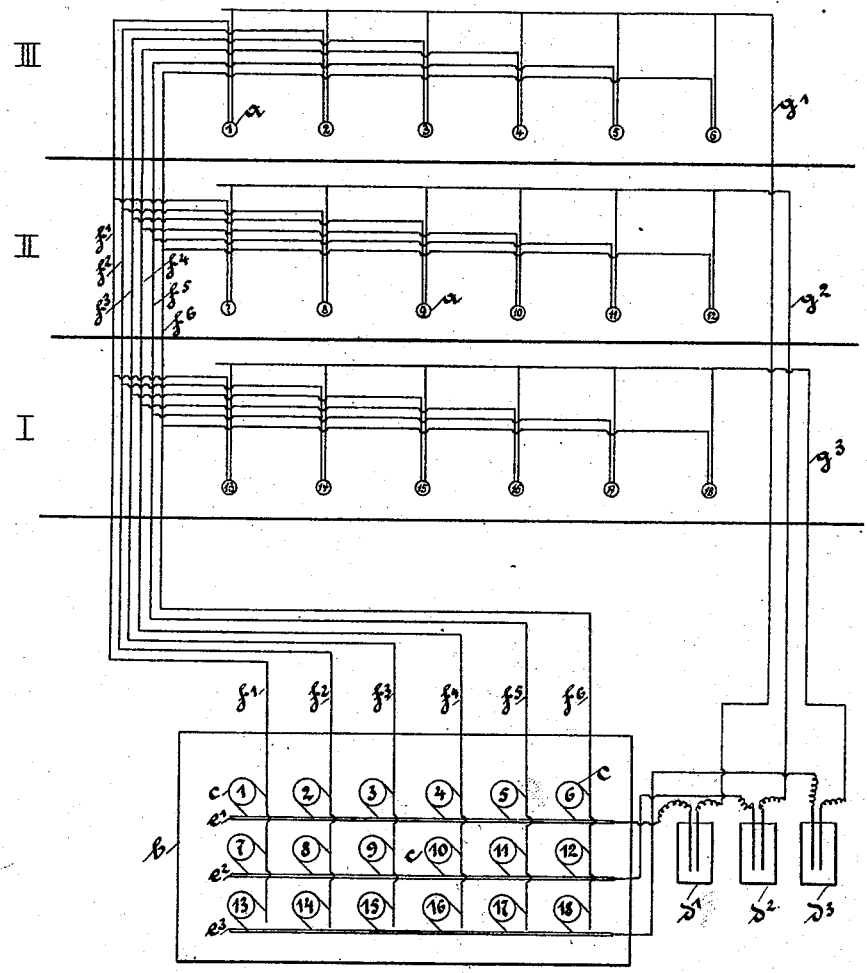
Witnesses:
Alex Wille. Eng.
Max Scheidig.
Inventor:
Philipp Weber.
By Goepel & Raegener
Attorneys

UNITED STATES PATENT OFFICE.

PHILIPP WEBER, OF NUREMBERG, GERMANY.

ANNUNCIATOR.

SPECIFICATION forming part of Letters Patent No. 524,098, dated August 7, 1894.

Application filed January 16, 1894. Serial No. 497,047. (No model.)

*To all whom it may concern:*

Be it known that I, PHILIPP WEBER, a subject of the German Emperor, residing at Nuremberg, in the Kingdom of Bavaria, Germany, have invented certain new and useful Improvements in Annunciators, of which the following is a specification.

The object of my invention is to provide a new and improved electric annunciator in which the wiring is very simple.

In the accompanying drawing, a diagram of my improved annunciator and the wiring for the same are shown.

The press-buttons $a$ are divided into three groups I, II, III, and the several buttons are marked 1, 2, 3, 4, 5, 6, &c. On the annunciator-board $b$ the magnets $c$ are arranged in three groups corresponding to the groups of the push-buttons there being as many magnets as there are push-buttons. The drops are arranged in front of the magnets in any suitable way and are not shown, as they form no part of my invention. Below each horizontal row of magnets $c$, a metal-strip $e'$, $e^2$, or $e^3$ is arranged, the magnets above each strip being connected with said strip. Said strips $e'$, $e^2$, $e^3$ are each connected with an element of a battery cell, one cell being provided for each strip, that is for each group of magnets. The other elements of the three cells are connected with the wires $g'$, $g^2$, $g^3$, which are connected by branch-wires with the several push-buttons of the groups III, II, I. The several push-buttons are connected by wires $f'$, $f^2$, $f^3$, $f^4$, and $f^6$, with the magnets, there being as many such wires as there are push-buttons and magnets in each group, in this case six. Each wire $f'$, $f^2$, &c., is connected with three magnets as there are three horizontal rows of magnets.

The electric circuit of any one push-button is as follows:—Suppose the push-button 11 in the group II is pressed to close the circuit, the latter will be as follows: from the battery cell $d^2$ through the wire $g^2$ to the corresponding push-button 11, through the branch-wire, the wire $f^5$ and through the same to the magnet 11 on the metal-strip $e^2$, to the battery cell $d^2$. The cell $d^2$ supplies current only for the circuits of the second group of push-buttons and magnets and for no other, and in similar manner the cells $d'$, $d^3$ supply current for the push-buttons and magnets of the groups III, and I respectively. By arranging the buttons and magnets in this manner, a single conducting wire can be used for operating the annunciators for different stories or groups, as the same wire that was used for conducting the current from the push-button when the push-button 11 was pressed, serves for conducting the current when the push-button 5 or 17 is pressed. This is made possible by dividing the push-buttons and magnets into groups of which each has its own cell, connecting the press-buttons of each group with one element of the corresponding cell and connecting the press-buttons of each group with the several magnets of the corresponding group, the wires that connect the press-buttons with the magnets however not only serving to connect a single push-button with a single magnet, but for connecting a push-button in each group with the corresponding magnet in the several groups of magnets.

The number of groups and the number of push-buttons and magnets in each group may be increased or decreased as circumstances may require. Relays may be used for extensive lines.

Having thus described my invention, I claim as new and desire to secure by Letters Patent—

1. An annunciator system, in which the press-buttons and magnets are divided into groups, a battery cell for each group, which cell has one terminal connected by a single wire with all the push-buttons of the group, as many return wires connected with the push-buttons as there are push-buttons in one group with which return wires the push-buttons of the remaining group are also connected, each return wire being connected with one magnet of each group, substantially as set forth.

2. In an annunciator system, the combination with a series of magnets and push-buttons divided into groups, a metal-strip for each group of magnets with which strips the several magnets of said group are connected, a battery cell connected with each strip, a single wire for connecting each battery with the press-buttons of the corresponding group, as many return wires as there are press-buttons in any one group, with which return wires all the press-buttons are connected, each return wire being connected with one magnet of each group, substantially as set forth.

In testimony that I claim the foregoing as my invention I have signed my name in presence of two subscribing witnesses.

PHILIPP WEBER.

Witnesses:
ALEX. WILLE TUOY,
MAX SCHEIDIG.